United States Patent

[11] 3,624,201

| [72] | Inventor | Leslie L. Balassa |
| | | Blooming Grove, N.Y. |
| [21] | Appl. No. | 704,540 |
| [22] | Filed | Feb. 12, 1968 |
| [45] | Patented | Nov. 30, 1971 |
| [73] | Assignee | Lescarden Ltd. |
| | | Goshen, N.Y. |

[54] COMPOSITIONS CONTAINING CALCIUM AND MAGNESIUM SALTS OF CITRIC, PHOSPHORIC AND LACTIC ACID AND METHOD OF PROMOTING HEALING OF WOUNDS THEREWITH
4 Claims, No Drawings

[52] U.S. Cl. .................................................... 424/95, 424/154, 424/317
[51] Int. Cl. ........................................................ A61k 17/00
[50] Field of Search .......................................... 424/28, 95, 154, 180, 317

[56] References Cited
UNITED STATES PATENTS

| 2,719,811 | 10/1955 | Cook et al. .................... | 424/317 |
| 2,910,408 | 10/1959 | Pope et al. .................... | 195/4 |
| 3,194,732 | 7/1965 | Neuhauser .................... | 424/28 |
| 3,196,075 | 7/1965 | Neuhauser .................... | 424/28 |

*Primary Examiner*—Albert T. Meyers
*Assistant Examiner*—Daren M. Stephens
*Attorney*—Darby and Darby ABSTRACT: Wound-healing compositions comprising calcium and magnesium slats of citric, phosphoric and lactic acid, and mixtures of the foregoing with chitin are described as well as methods of promoting healing of wounds, and the process of producing eggshells reacted with citric, phosphoric or lactic acid.

COMPOSITIONS CONTAINING CALCIUM AND MAGNESIUM SALTS OF CITRIC, PHOSPHORIC AND LACTIC ACID AND METHOD OF PROMOTING HEALING OF WOUNDS THEREWITH

This invention relates to methods of promoting healing of wounds and compositions therefor containing calcium and magnesium salts of citric, phosphoric and lactic acid.

Medicine has long been interested in improving the healing of wounds. Patients suffering from diabetes or undergoing extensive cortisone treatment show extremely slow rates of healing for any wounds which they receive. Thus, surgery on such patients involves additional risks not present with other patients. Moreover, rapid healing of wounds is particularly desired for patients in tropical countries where the risk of infection is high. Rapid healing is also desired in the case of soldiers who have been wounded in a battle zone and cannot easily and quickly be removed therefrom. Acceleration of wound healing is highly desirable in the case of patients who cannot readily be immobilized such as farm animals.

In evaluating the utility of a material to promote wound healing, a reproducible test is necessary to give comparative data. Such a test method has been described by Prudden et al. in: "The Acceleration of Wound-Healing with Cartilage," Surgery, Gynecology and Obstetrics, 105:283 (1957). In this method, rats are tested in pairs, each pair receiving an identical surgical incision, only the one rat of the pair receiving a measured dose of the material whose wound healing properties are to be determined. The pair is then kept in the same cage and the tensile strengths of the wounds in the two rats are determined in millimeters of mercury. The difference in the tensile strengths between the treated rat and the control rat is expressed as the percentage improvement obtained. Considering biological variance it is believed that only differences of about 10 percent or more are significant.

There have been several recent developments reported concerning materials which promote wound healing. In this connection U.S. Pat. No. 3,232,836 describes the parenteral administration of N-acetyl glucosamine as a wound healing material. Utilizing the test method of Prudden et al. referred to in the preceding paragraph, N-acetylglucosamine showed improvement in tensile strength of only about 10 percent whereas Prudden and his coworkers have reported significantly larger increases in wound healing by the use of cartilage preparations from various animals. It has also been reported in U.S. Pat. Nos. 3,194,732 and 3,196,075 that eggshell membrane in either fibrous or nonfibrous form are effective for stimulating or assisting the healing process in damaged mammalian tissue. According to these patents the eggshell membrane is obtained by separation of this material from the eggshell by mechanical or other suitable means, with the membrane-free eggshell being discarded. In my copending application Ser. No. 504,739 filed Feb. 12, 1968 it is disclosed that membrane-free eggshells are an effective wound-healing accelerator.

Now it has been surprisingly discovered that eggshells with or without adhering membrane are a highly effective wound healing accelerator when reacted with citric phosphoric, or lactic acid and that calcium and magnesium salts of citric, phosphoric, or lactic acid may be used alone or in combination with other wound healing accelerators to produce results in accordance with the method of Prudden et al. which are at least equal to and in many instances greater than the results obtained with the prior art wound healing accelerators.

Accordingly, one aspect of the present invention relates to novel methods of promoting and assisting the healing of wounds, as for example, damaged mammalian tissue, open ulcers, etc. in humans and animals.

Another aspect of the present invention relates to significant improvements in wound healing of tissue that has been lost or damaged as a result of injuries, by the topical application of at least one finely divided material such as eggshells with or without adhering membrane, reacted with citric, phosphoric, or lactic acid, or finely divided calcium and magnesium salts of citric, phosphoric, or lactic acid, e.g. calcium citrate, calcium phosphate, calcium lactate, or a mixture of the foregoing materials with chitin.

A further aspect of the present invention relates to novel compositions for accelerating the healing of wounds and their method of production.

These and other aspects of the present invention will be apparent from the following description.

As used herein the expression "eggshells" means the calcareous portion of the egg with and without the adhering eggshell membrane. Thus, this term includes membrane-free eggshells and eggshells with adhering membrane.

As used herein the term "chitin" embraces naturally occurring chitin, synthetic chitin as well as poly (N-acetylglucosamine) and its epimer poly(N-acetylgalactosamine). Chitin is believed to be poly (N-acetylglucosamine) which forms the cell walls of fungi and the hard shell of insects and crustaceans.

The wound healing accelerators contemplated by the present invention include calcium and magnesium salts of citric, phosphoric or lactic acid such as calcium citrate, magnesium citrate, calcium phosphate (e.g. monobasic, dibasic) calcium lactate and the product obtained by reacting eggshells with citric, phosphoric or lactic acid (hereinafter referred to as acid treated eggshells) and a mixture of these salts and/or acid treated eggshells with chitin.

It has surprisingly been discovered that the combination of chitin with calcium citrate produces an increase in wound healing activity which substantially exceeds the increase in wound healing resulting from the use of any of the above-identified materials alone.

The preferred salt of the present invention is calcium citrate which has produced an increase in wound healing in rats determined according to the method of Prudden et al. of at least about 35 percent.

The citrated eggshells may be produced by adding citric acid to the eggshells either before or during the grinding operation which converts the eggshells into a finely divided material. Preferably the quantity of citric acid reacted with the eggshells should not exceed the stoichiometric proportions, to assure that there will be no unreacted citric acid. The presence of free citric acid in the finely divided citrated eggshells would irritate the wound surface. Eggshells contain in the order of about 90 percent calcium carbonate and calcium phosphate and therefore the quantity of citric acid used should be based on the total weight of these materials in the eggshells. If more than the stoichiometric quantity of citric acid is used, the resulting citrated product must be thoroughly washed with water to remove any excess acid. The same procedure is employed when it is desired to react phosphoric acid or lactic acid with eggshells.

Suitable sources of chitin are from lobsters, shrimp and other crustacea. To utilize chitin from such sources, it is necessary to reduce the chitin in particle size to less than about 150 microns. Lobster shell chitin is purified by slurrying it in 1N HCl to remove the acid soluble materials and then washed with aqueous NaOH to remove the soluble protein materials. Thereafter the material is thoroughly washed with distilled water, dried and ground to the desired fineness.

Chitin of fungal origin may also be used and has the advantage of being simpler to process. The cell walls of fungi are made of chitin and it is not necessary to extract the chitin from this material. Thus, after suitable sterilization as by heat or gas (i.e. ethylene oxide), the entire fungal mat produced by fermentation of a fungus in a suitable nutrient medium may be ground and used to promote healing of wounds. Preferably, however, the fungal mat is treated to remove the extraneous materials, leaving only the chitin skeletons.

The method of application of the wound healing accelerators of this invention may be carried out in accordance with the procedures developed for cartilage as described in my copending application Ser. No. 435,693 filed Feb. 26, 1965 now U.S. Pat. 3,400,199. This patent describes the procedures of application in column 3, lines 15 through 70, the disclosure of which is incorporated herein by reference. The same procedures are also described in corresponding British Patent 1,041,172 issued Sept. 1, 1966. Thus, it is preferred to topically apply the foregoing materials directly to the wound surface. The finely divided citrated eggshells and calcium or magnesium citrates, phosphates, or lactates have a fineness preferably in the range of 40 to 70 microns. However, a fineness of up to about 200 microns is acceptable.

The finely divided wound healing accelerators may be applied topically by blowing a metered amount of the material onto the wound using a hand atomizer. Alternatively, it may be applied by dusting as from a hand shaker or may be placed together with an inert gas under increased pressure (i.e. above atmospheric pressure) in a pressure vessel. In this latter means of application, termed "aerosol application," the finely divided material, optionally with other medicaments, may be packaged as a dry aerosol powder as described in Dutch patent application 6,415,252 published July 5, 1965 (this patent application is directed to a medicament for bovine mastitis but the method of aerosol packaging described is applicable to powdered medicament having the described particle size) or as an aerosol foam.

The wound healing accelerators of the present invention may be used alone or with therapeutically effective agents such as ascorbic acid, ascorbyl palmitate, pharmaceutically acceptable zinc salts, e.g. zinc oxide, zinc stearate, zinc citrate; antiseptics such as lidocaine, procaine, etc.; antibiotics such as neomycin, chloroamphenicol, sulfanilamide, tetracycline, etc.

The following examples are illustrative of the wound healing activity of the various materials of the invention. The wound efficiency is determined by using the method of Prudden et al. as described above. In general, at least 10 pairs of rats are used to obtain a meaningful average for each material tested. In each of these examples a powder insufflator is used to apply 2 to 10 mg. of material per cm.$^2$ of wound surface.

EXAMPLE 1

One hundred grams of dried eggshells with adhering membrane free of the yolk and albumen are placed in a laboratory ball mill with 50 grams of citric acid, 200 grams of distilled water and 500 grams of alundum balls and ball-milled for 16 hours. The resulting product is a pastelike material. The ball mill is discharged and the eggshell paste material is washed from the balls with distilled water, filtered, and the paste on the filter is dried in a vacuum at ambient temperature.

The resulting citrated eggshell powder was topically applied to 10 test rats of 10 pairs of rats in accordance with the Prudden assay method described above. An average of 38 percent increase in wound healing over the untreated animals was observed.

EXAMPLE 2

Reagent grade calcium citrate was placed in a laboratory ball mill and reduced to a fineness between about 40 to 70 microns.

The resulting calcium citrate powder was topically applied to 22 test rats of 22 pairs of rats as previously described. Using the Prudden et al. assay method, an average increase of about 37 percent in wound healing over the untreated animals was observed.

EXAMPLE 3

An equal quantity of finely divided calcium citrate and finely divided chitin derived from lobsters are mixed together until a uniform mixture is obtained.

The resulting mixture was topically applied to 36 test rats of 36 pairs of rats as previously described using the Prudden et al. assay method. An average of 55 percent increase in wound healing over the untreated animals was observed.

EXAMPLE 4

Reagent grade magnesium citrate was placed in a laboratory ball mill and reduced to a fineness between about 40 to 70 microns.

The resulting magnesium citrate powder was topically applied to 11 test rats of 11 pairs of rats as previously described. Using the Prudden et al. assay method, an average increase of about 22 percent in wound healing over the untreated animals was observed.

EXAMPLE 5

Reagent grade calcium phosphate (dibasic) was placed in a laboratory ball mill and reduced to a fineness between about 40 to 70 microns.

The resulting calcium phosphate powder was topically applied to 10 test rats of 10 pairs of rats as previously described. Using the Prudden assay method, an average increase of about 24 percent over the untreated animals was observed.

A finely divided power or dispersion of the wound healing materials of this invention may also be used in conjunction with materials such as cotton or cellulosic fibers and deposited as a coating or coatings on base materials such as cellulose or cellulose acetate or nylon or regenerated cellulose, or plastic base materials, either woven or nonwoven in sheet form, perforated or imperforate. Moreover, the finely divided wound healing accelerators of the present invention may be bonded to a suitable base material, e.g. cotton gauze, plastic sheet, etc. using an appropriate adhesive formulation, e.g. pectin, gelatin, starch, innocuous vegetable gums, etc. The foregoing articles of manufacture can be obtained in accordance with the procedures described in the examples of U.S. Pat. No. 3,194,732.

Although the present invention has been described in conjunction with preferred embodiments, it is to be understood that modifications and variations may be resorted to without departing from the spirit and scope thereof, as those skilled in the art will readily understand.

What is claimed is:

1. A process for facilitating the healing of a wound in a mammal which comprises either parenterally or topically administering to a mammal having a wound a therapeutically effective dose of a finely divided reaction product which is prepared by grinding eggshells containing calcium carbonate with an acid selected from the class consisting of citric and phosphoric acid to produce the calcium salt of said acid, whereby said reaction product when administered contains no unreacted acid.

2. A process according to claim 1, wherein said therapeutically effective dose is administered topically.

3. A process according to claim 1 wherein said therapeutically effective dose is administered parenterally.

4. A process according to claim 1 wherein said average particle size of said finely divided material does not exceed about 70 microns.

* * * * *